US007643307B2

(12) United States Patent
Bosco et al.

(10) Patent No.: US 7,643,307 B2
(45) Date of Patent: Jan. 5, 2010

(54) FAIL SAFE REDUNDANT POWER SUPPLY IN A MULTI-NODE COMPUTER SYSTEM

(75) Inventors: Frank E. Bosco, Poughkeepsie, NY (US); Douglas A. Baska, Pine Island, MN (US); Joseph P. Corrado, Marlboro, NY (US); Gerald J. Fahr, Wappingers Falls, NY (US); William P. Kostenko, Poughkeepsie, NY (US); Mitchell L. Zapotoski, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 11/239,602

(22) Filed: Sep. 29, 2005

(65) Prior Publication Data

US 2007/0069585 A1 Mar. 29, 2007

(51) Int. Cl.
*H05K 5/00* (2006.01)

(52) U.S. Cl. .................. 361/757; 361/600; 361/730; 361/796

(58) Field of Classification Search .................. 361/757, 361/115, 600, 687, 694, 729, 730, 796, 797
See application file for complete search history.

(56) References Cited

U.S. PATENT DOCUMENTS

| | | | | | |
|---|---|---|---|---|---|
| 3,848,262 | A | * | 11/1974 | Belcastro | 360/60 |
| 6,014,319 | A | * | 1/2000 | Kuchta et al. | 361/788 |
| 6,058,019 | A | | 5/2000 | Graves et al. | |
| 6,166,919 | A | | 12/2000 | Nicolici et al. | 361/800 |
| 6,606,253 | B2 | * | 8/2003 | Jackson et al. | 361/796 |
| 6,738,262 | B2 | | 5/2004 | Trioli et al. | 361/753 |
| 6,900,387 | B2 | * | 5/2005 | Gravell et al. | 174/50 |
| 6,915,440 | B2 | * | 7/2005 | Berglund et al. | 713/340 |
| 6,934,879 | B2 | * | 8/2005 | Misra et al. | 714/6 |
| 6,984,001 | B2 | * | 1/2006 | Nilsson | 303/20 |
| 7,079,555 | B2 | * | 7/2006 | Baydar et al. | 370/532 |
| 7,088,583 | B2 | * | 8/2006 | Brandon et al. | 361/694 |
| 7,113,401 | B2 | * | 9/2006 | Becker et al. | 361/694 |
| 7,215,535 | B2 | * | 5/2007 | Pereira | 361/624 |
| 7,271,999 | B2 | * | 9/2007 | Rabinovitz | 361/685 |
| 7,328,297 | B2 | * | 2/2008 | Chu | 710/301 |
| 2003/0016515 | A1 | | 1/2003 | Jackson et al. | 361/796 |
| 2003/0112582 | A1 | | 6/2003 | Sanders et al. | 361/600 |
| 2003/0169580 | A1 | | 9/2003 | Brooks et al. | 361/800 |
| 2003/0206402 | A1 | | 11/2003 | Tsuyuki et al. | 361/725 |
| 2004/0062002 | A1 | | 4/2004 | Barringer et al. | 361/687 |

* cited by examiner

*Primary Examiner*—Dean A. Reichard
*Assistant Examiner*—Xiaoliang Chen
(74) *Attorney, Agent, or Firm*—Geraldine D. Monteleone; Lily Neff (57) ABSTRACT

A data processing system and method providing a jumper which provides standby power from a redundant power supply to one of at least two critical functions in a frame having bays for holding at least two nodes. The redundant power supply supplying power to one of the nodes in the frame and one of the critical functions. A jumper is slidably engageable in the frame in place of one of the nodes. The jumper, when engaged in the frame, transfers power from the redundant power supply to the other of the critical functions. The jumper is included in a jumper book of an airblock which includes passive airblock books. Mechanical keys on the passive airblock books prevent the removal of the jumper book until after the passive airblock books are removed.

16 Claims, 7 Drawing Sheets

FAIL SAFE REDUNDANT POWER SUPPLY IN A MULTI-NODE COMPUTER SYSTEM

FIELD OF THE INVENTION

This invention relates to redundant power supplies, and more particularly to supplying power to essential functions in multi-node systems from redundant power supplies.

BACKGROUND OF THE INVENTION

In a multi-node computer system, critical functions common to all nodes must be highly reliable and therefore redundantly powered. In the disclosed system, the configurations vary from one node to four nodes. The oscillator (OSC) and system control processor referred to herein as the Flexible Service Processor (FSP) is duplicated for all configurations. For multimode configurations, it is a Reliability Availability Serviceability (RAS) requirement to power each OSC/FSP pair from an independent set of power supplies, but both pairs must be powered when a single node is installed.

One prior art solution is to always power the critical function from the first node power supplies since the power supplies are themselves N+1. This solution does not meet more stringent requirements of newer systems and requires the first node installed to be in a fixed position which is not flexible for future applications.

Another prior art solution is to install the power supply set for the second node in a single node configuration. This solution is costly and does not provide flexibility in the power connection.

U.S. Pat. No. 6,166,919 issues Dec. 26, 2000 to Nicolici et al. for CASING MOUNTABLE FILLER MODULE discloses a filler module slidably mountable in an otherwise unused slot of a multi-slot, multi-module electronic system housed in a casing. The casing provides that air flow is maintained in the shelf independent of the number or position of used and unused slots.

U.S. Pat. No. 6,738,262 B2 issued May 18, 2004 to Trioli et al. for PORT FILLER BAFFLE discloses an apparatus for hindering the collection of dust and particulate matter within unutilized housings or ports of hardware component chassis.

U.S. Patent Application Publication No. US2003/0016515 A1 published Jan. 23, 2003 by Jackson et al. for SCALABLE INTERNET ENGINE discloses a scalable internet engine comprised of a large number of commercially available server boards each arranged as an engine blade in a power and space efficient cabinet.

U.S. Patent Application Publication No. US 2003/0112582 A1 published Jun. 19, 2003 by Sanders et al. for REDUNDANT DATA AND POWER INFRASTRUCTURE FOR MODULAR SERVER COMPONENTS IN A RACK discloses a modular infrastructure of a computer server rack comprising modular server chassis, each chassis configured to receive a plurality of servers and two network switches and including redundant AC to DC power supplies. Each power supply is sufficient to power the entire rack.

U.S. Patent Application Publication No. US 2003/0169580 A1 published Sep. 11, 2003 by Brooks et al. for KEYED FILLER PANEL WITH REMOVABLE-COUPLEABLE AIRFLOW RESISTIVE FILLER CARD ASSEMBLY discloses a keyed filler panel with removable-coupleable airflow resistive filler card assembly.

U.S. Patent Application Publication No. US 2003/0206402 A1 published Nov. 6, 2003 by Tsuyuki et al. for SYSTEMS FOR USE WITH DATA STORAGE DEVICES discloses systems for mounting data storage devices to a chassis.

U.S. Patent Application Publication No. US 2004/0062002 A1 published Apr. 1, 2004 by Barringer et al. for HIGH DENSITY MODULAR INPUT/OUTPUT PACKAGE IN A DATA PROCESSING SYSTEM discloses an I./O subsystem for providing a high density modular input/output package in a data processing system including redundant power supplies. When a DASD device of the subsystem is not included, a blank cartridge is used in its place to preserve cooling air flow.

SUMMARY OF THE INVENTION

A primary object of the present invention is to use an airblock book chassis to provide a jumper that connects the power distribution circuits for the first and second node. The airblock is present in the absence of a power supply in order to balance air flow through the machine. A jumper does double duty at a modest increase in cost for the position used. A more reliable installation results since the power supply and airblock book plugging are mutually exclusive.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
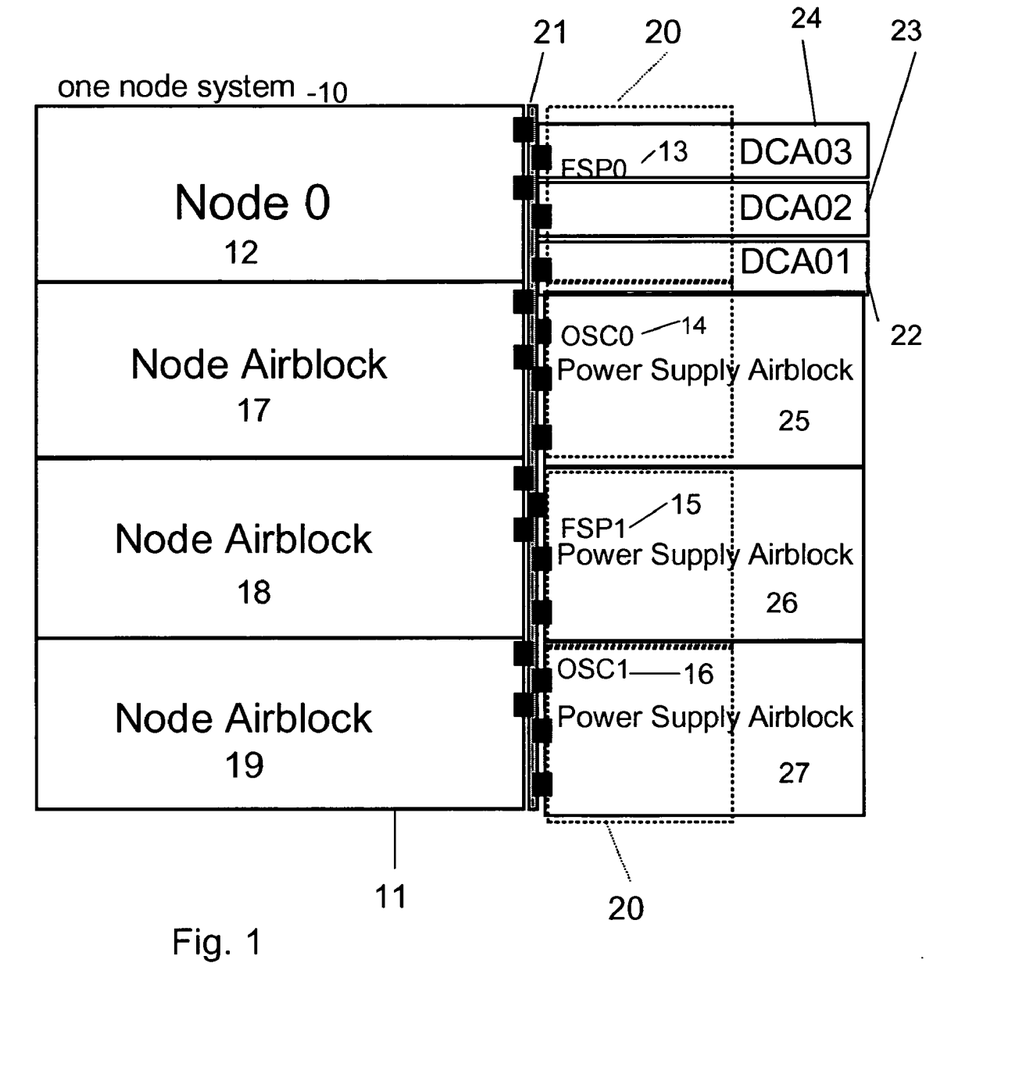
FIG. 1 is a schematic diagram of a one node system having a single node and three node airblocks.
Figure 2:
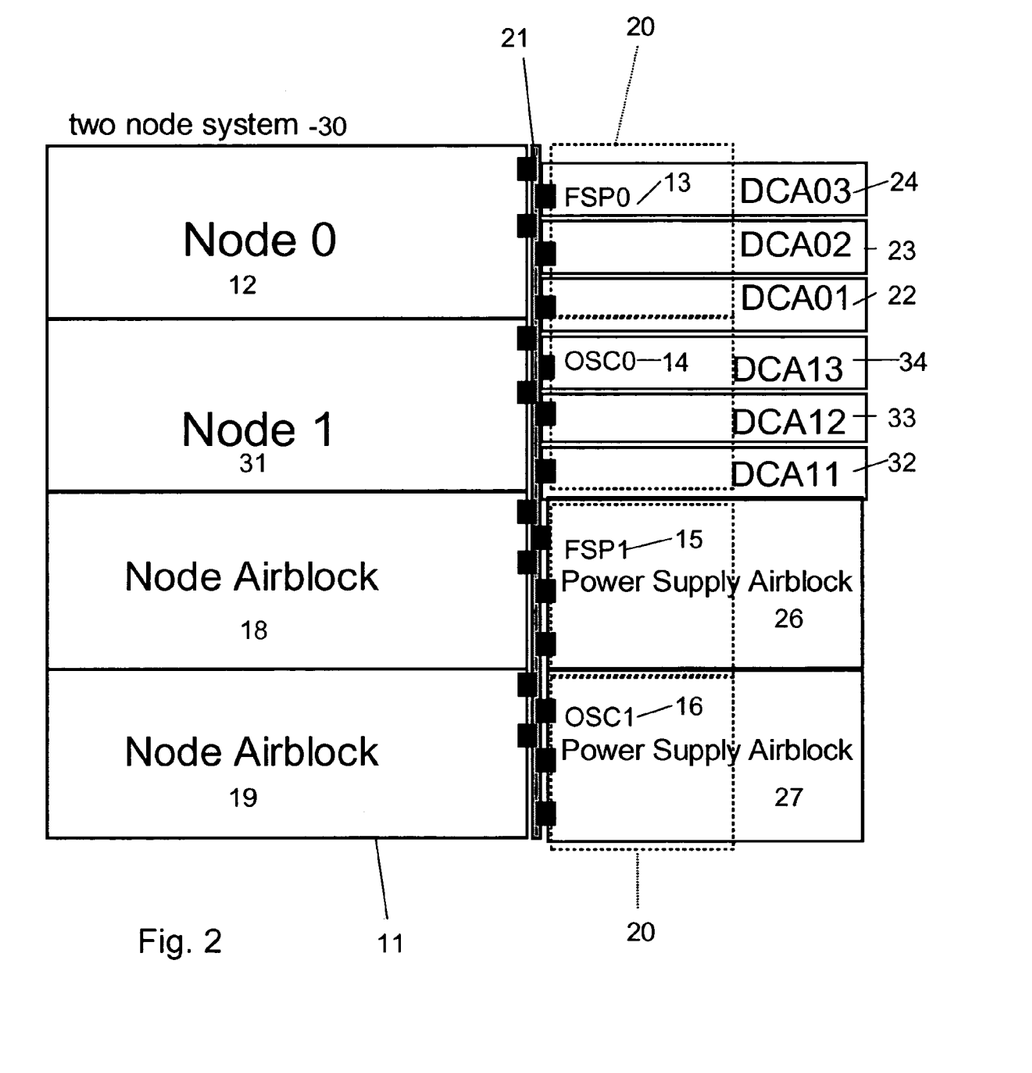
FIG. 2 is a schematic diagram of a two node system having two nodes and two airblocks.
Figure 3:
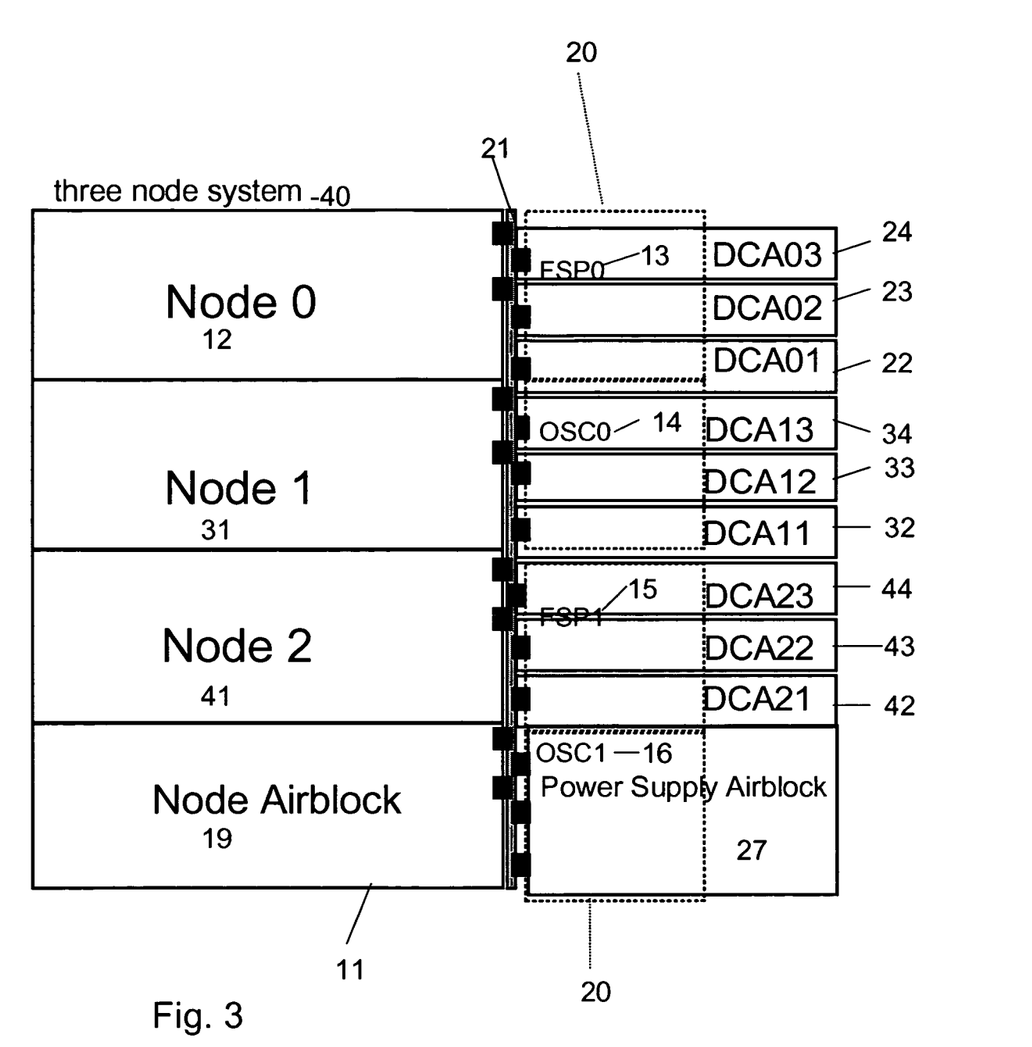
FIG. 3 is a schematic diagram of a three node system having three nodes and one airblock.
Figure 4:
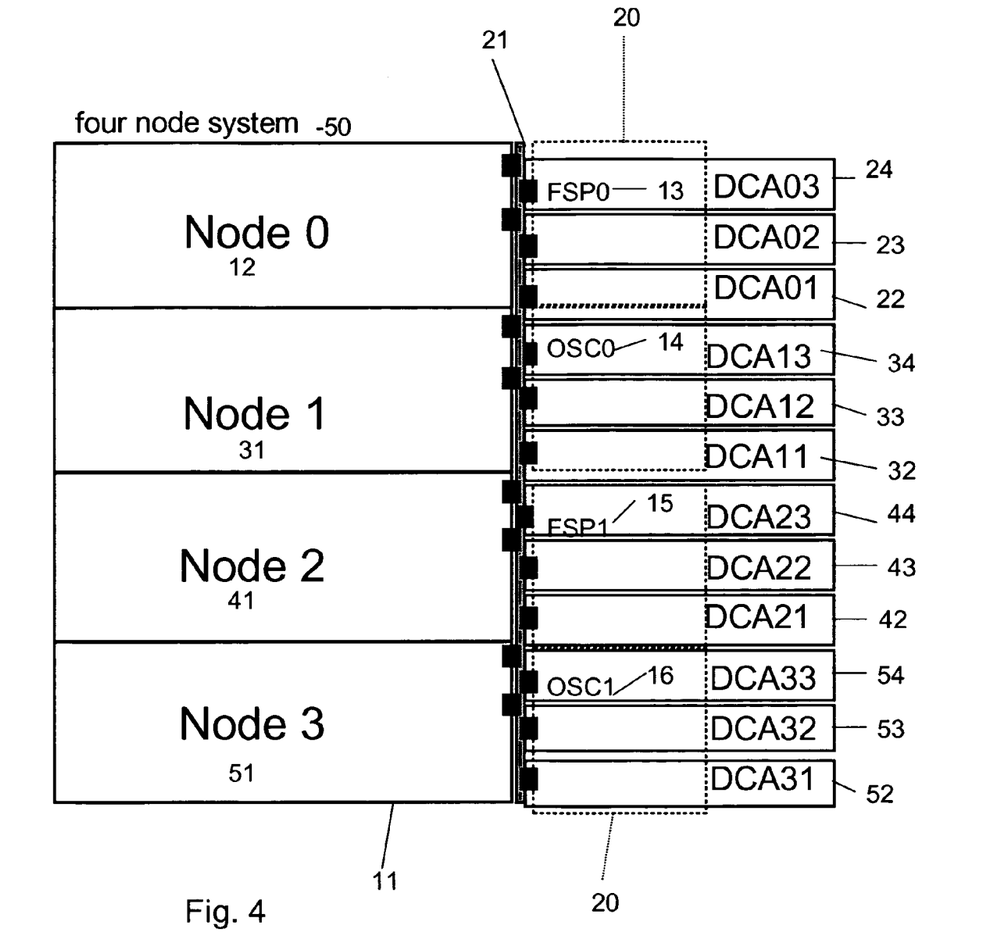
FIG. 4 is a schematic diagram of a four node system having four nodes.

A processor system has four multi-processor nodes which are independently supplied with electrical power. A system can consist of one node as shown in FIG. 1, two nodes as shown in FIG. 2, three nodes as shown in FIG. 3, or four nodes as shown in FIG. 4. The system contains critical function common to all nodes, i.e. the system oscillator (OSC) and the system control processor (FSP) functions which are implemented redundantly (two of each). Both sets of critical function are required for all system configurations from one node to four nodes. In FIG. 1, a one system node 10 is mounted in a system frame 11 having bays for receiving at least four nodes. The system 10 has a single node 12, a system control processor 0 (FSP0) 13, and an oscillator 0 (OSC0) 14, an FSP1 15, and an OSC1 16. The bay for the second node is blocked by node airblock 17, the bay for the third node is blocked by node airblock 18, and the bay for the forth nodes is blocked by node airblock block 19. The airblocks provide for distributing cooling air through the frame 11 when nodes are not installed, as is well known in the art.

As mentioned, the common function 20 of FSP013/OSC0 14 and FSP1 15/OSC1 16 are always required. A power supply set of three logical power supplies, referred to herein as Distributed Converter Assemblies (DCAs), is required for each node, and connected to each node by power supply cables 21. The power supply set for each node is N+1 redundant. All node function requires two out of three power supplies DCA to be operating, that is a single failed power supply DCA can be tolerated in each node. It is further required for multinode systems (two or more), that each set of critical function be supplied with electrical power by an independent set of power supplies. As shown in FIG. 1, Node 0 12 has DCA01 22, DCA02 23, and DCA03 24. The positions in the frame 11 for the second power supply position is blocked by power supply airblock 25, the position for the third power supply position is blocked by power supply airblock 26, and the position for the forth power supply position is blocked by the power supply airblock 27. As previously explained, the power supply airblocks 25-27 provide for the proper cooling air distribution when the power supply for that position is not installed, as is well known. FSP0 13 and OSC0 14 are supplied by power supply set DCA01 22, DCA02 23, and DCA03 (hereinafter DCA01/02/03 32/33/34). In the case of a system containing a single node shown in FIG. 1, FSP0 13, OSC0 14; FSP1 15 and OSC1 16 are all supplied by the power supply set DCA01 22, DCA02 23, and DCA03 24.

A two node system is shown in FIG. 2 wherein like parts are numbered with the same numbers as the components of FIG. 1. In the two node system 30, Node1 31 is located in the second node bay, and a second power supply set of DCA11 32, DCA12 33 and DCA13 34 ((hereinafter DCA11/12/13 32/33/34) are located in the second power supply set position in the second node bay. In the two node system 30, FSP1 15 and OSC1 are powered by power supply set DCA11/12/13, 32/33/34.

A three node system is shown in FIG. 3 wherein like parts are numbered with the same numbers as the components of FIGS. 1 and 2. In the three node system 40 of FIG. 3, Node2 41 is located in the third node bay in the frame 11. A third power supply set DCA21/22/23 42/43/44 is located third node bay in the third power supply set location.

A four node system is shown in FIG. 4 wherein like parts are numbered with the same numbers as the components of FIGS. 1, 2 and 3. In the four node system 50 of FIG. 4, Node3 51 is located in the fourth node bay in the frame 11. A fourth power supply set DCA31/32/33 52/53/54 is located in the fourth node bay in the fourth power supply set location.

Note that the power distribution circuits DCA21/22/23 for Node2 41 and DCA31/32/33 for Node3 51 only energize circuitry within their respective nodes. DCA11/12/13 supplies power to Node1 31 and DCA01/02/03 supplies power to Node0 12, and also supply power to the critical function 20 as described above.

Figure 5:
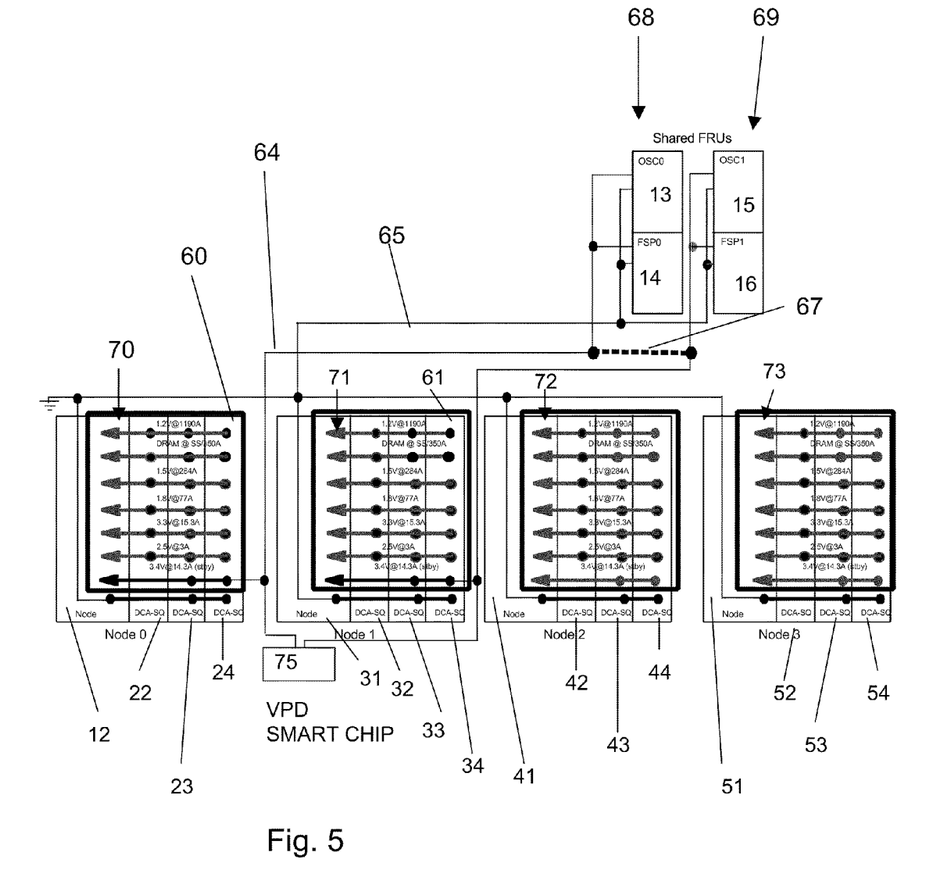
FIG. 5 is a schematic diagram illustrating the power board structure of a four node system.

FIG. 5 further illustrates the four node system 50 of FIG. 4 including circuitry to power OSC0 13, FSP0 14, OSC1 15 and FSP1 16. Node0 12 has a Power Boundary 0 60 established by DCA01/02/03 22/23/24. Node1 31 has a Power Boundary 1 61 established by DCA11/12/13 32/33/34. Node2 41 has a Power Boundary 2 62 established by DAC21/22/23 42/43/44. Node3 51 has a Power Boundary 3 63 established by DCA31/32/33 52/53/54. Power Boundary 0 60 has a power lead 64 which powers OSC0 13 and FSP0 14. Power Boundary 1 61 has a power lead 65 which powers OSC1 15 and FSP1 16. A jumper 67 jumps power between leads 64 and 65 such that power boundary 60 may power the lead 65 when Power Boundary 1 61 is not present, such as in a single node system 10 shown in FIG. 1. The dashed line represents the jumper 67 function which connects the Node 1 power distribution circuitry to that of Node0 for the case when Node1 and its power supplies are not installed. In one embodiment, OSC0 13, FSP0 14, OSC1 15, and FSP1 16 may be placed in shared Field Replaceable Units (FRUs) 68 and 69.

Note that the power distribution circuits 42/43/44 and 52/53/54 for Node2 41 and Node3 51, respectively, only energize circuitry within the respective nodes. Node0 12 and Node1 31 supply power to the nodes and the critical function 20 as described above. A Vital Product Data (VPD) smart chip 75 is provided between Power Boundary 0 60 and Power Boundary 1 61 as shown in FIG. 5. The VPD chip 75 includes data in memory which describes system components so that the system knows what components are installed.

The power cables 21 of FIGS. 1-4 include power supply connectors 70, 71, 72 and 73, for connecting a power supply unit to its respective node. Each power supply connector is composed of a multiplicity of conductor assemblies, each of which contains two separate conductors or pins, one long and one short. The long pin connects to a voltage to be supplied and the short pin connects to ground. The uppermost conductor assembly long pin is used for soft charging the output capacitors of the power supply while the short pin is a spare, normally may be arbitrarily grounded. In one embodiment, the spare short pin is not connected i.e. left open in the power supply. The corresponding receptacles in the printed circuit board for these spare short pins are also left open in the board, except for one the jumper position. The jumper position is a power supply position in the power supply set for the second node (designated Node 1). In the jumper position, the receptacle for the spare pin is connected to the power supply circuitry of Node 0 which supplies the critical function FSP0/OSC0 as described above. If the jumper position is empty or occupied by a power supply, there is no connection made to the Node 0 power distribution circuitry in the Node 1 board section. Ordinarily when a power supply is not installed, an empty metal box with dimensions approximately those of the power supply and specially designed perforations (designated as power supply airblocks in FIGS. 1-3) is installed in its place to help maintain proper airflow through the system. The jumper 67 is included in an airblock book containing a small printed circuit card which connects the spare pin described above to the normal conductor assembly that provides the energy supply to the critical function. So when the jumper airblock book is installed, the two power distribution circuits are connected and the Node0 power supplies 22/23/24 will energize all critical functions 20.

Figure 6:
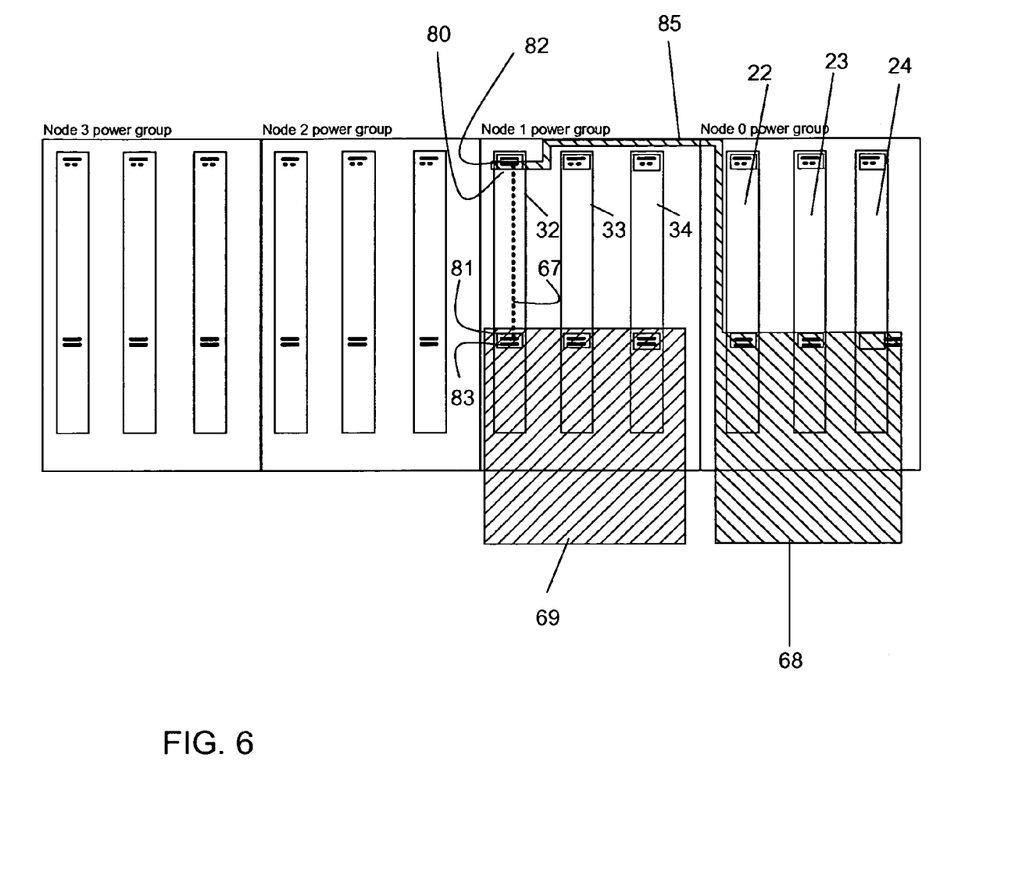
FIG. 6 is a schematic diagram illustrating power groups in a four node system having a jumper function which connects one power distribution circuitry of one node to provide power to a critical function in the case when a second node and its power supplies are not installed.

FIG. 6 is an illustration of the jumper connections for one of the DCAs, for instance DCA01 22, and the power supply airblock 25. In FIG. 6, it will be understood that the power supply units 32/33/34 are not installed. Instead, the power supply airblock 25 is installed. As explained, the connections for DCA01 32 has a spare pin 80 in the upper connector 82, and a power pin 81 in the lower connector 83. The power pin 81 is the normal connection that provides the energy to FSP1/OSC1 15/16 of FRU 69. A power conductor 85 extends from the FRU 68 for providing standby voltage for FSC1/OSC1 to the spare pin 80. The jumper 67 in the jumper airblock 25 is connected between the spare pin 80 and normal power pin 81. As explained, when the jumper 67 in power supply airblock 25 is installed, standby power is supplied to FSP1/OSC1 15/16 by spare pin 80 over the jumper 67. In one embodiment, when either or both of the DCA12 33 and DCA13 34 are installed, power is supplied to FSP1/OSC1 15/16.

In one embodiment, the addition of a second node to the system is made without disrupting the system operation (hot plugging). That is, the jumper 67 is not removed until power is supplied by power supplies installed into two of the positions within the power supply set for Node 1.

Figure 7:
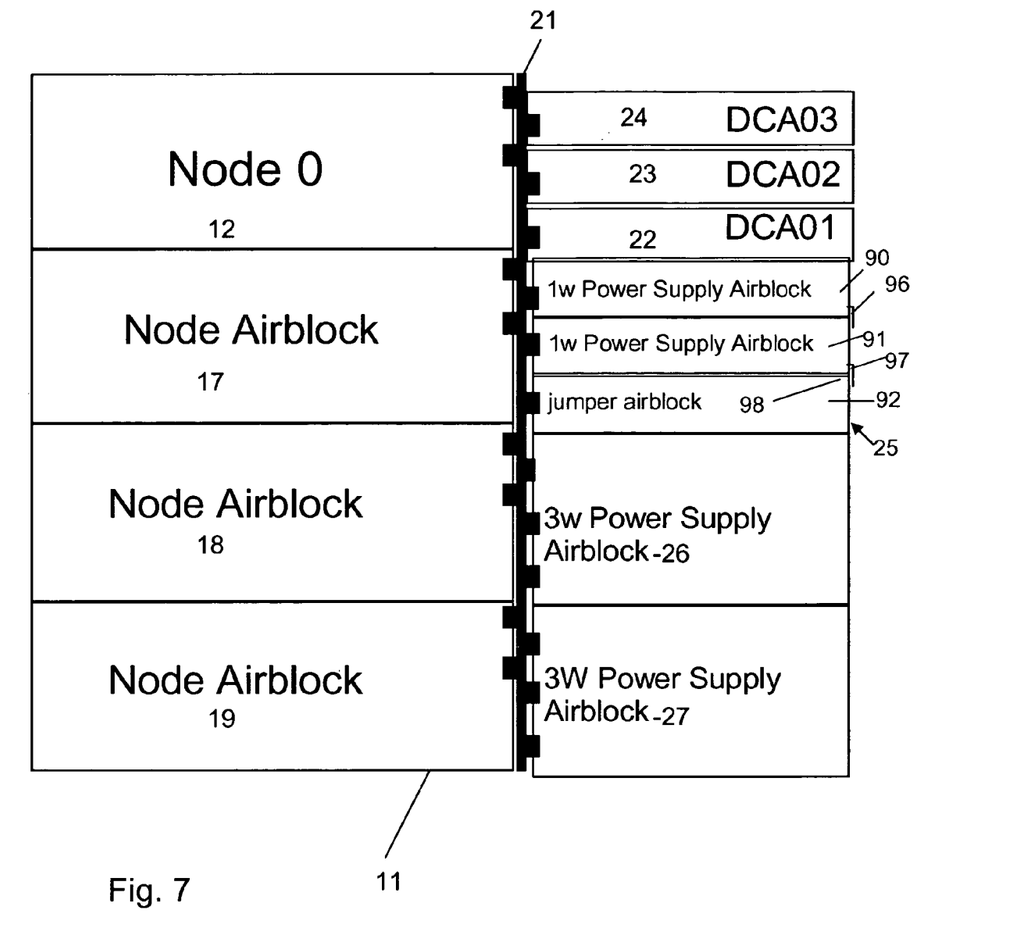
FIG. 7 is a schematic diagram showing interlock tabs for preventing the jumper of FIG. 6 from being prematurely unplugged.

FIG. 7 illustrates one embodiment of the power supply airblock 25 having three books 90, 91 and 92. Power supply airblock books 90 and 91 are passive airblocks. Power supply airblock book 92 is a jumper airblock having the jumper 67 described. Each of the airblock books 90, 91 and 92 is one power supply position wide (1w). Being one power supply position wide provides that the jumper airblock 92 may remain installed until power supplies DCA12 33 and DCA13 34 are installed and powered on in the Node 1 set. In one embodiment, the power supply airblocks 26 and 27 for the node 2 and 3 positions are three power supplies wide (3w) to save hardware.

Mechanical keys 96 and 97 are provided so that the jumper book 92 cannot be unplugged first before DCAs 33 and 34 are plugged in. The mechanical keys 96 and 97 are overlapping tabs on the passive airblock books 90 and 91. The jumper book 92 has tab engagement surface 98 which engages with the mechanical key 97 and prevents jumper book 92 from being removed from the frame 11 when the passive airblock book 91 is in place. It will be understood that the key 96 allows airblock book 90 to be unplugged first, but prevents airblock book 91 from being unplugged first. Similarly, key 97 allows airblock book 91 to be unplugged after airblock book 90, but prevents airblock book 92 from being unplugged before airblock book 91.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for supplying power to critical functions in a data processing system comprising:
   providing a frame having bays for holding system components including at least two nodes;
   providing in said frame further system components including at least two sets of critical functions, said sets of critical functions being supplied to each node in said frame;
   supplying from a redundant power supply, power to one of said nodes in said frame and one set of said critical functions, said redundant power supply comprises three logic power supplies, each logic power supply slidably engageable in a node in said frame;
   slidably engaging in said frame in place of one of the nodes, a jumper book including a jumper engageable with said frame which, when engaged in said frame, transfers power from said redundant power supply to the other set of said critical functions; and
   engaging a power connector in said frame with a jumper connector in said jumper book when said jumper book is slidably engaged in said frame, said power connector being connected to at least one of said logic power supplies of said redundant power supply, said jumper being connected to said jumper connector and at least one of said critical functions such that standby power is transferred to the connected critical function when said jumper book is slidably engaged in said frame.

2. The method according to claim 1 further comprising connecting in at least one node installed in said frame, an oscillator and a system control processor in each set of critical functions.

3. The data processing system according to claim 1 wherein said jumper book is an airblock providing for the distribution of cooling air in said frame when said airblock is engaged in said frame.

4. The method according to claim 3 wherein said method further comprises recording system components in a vital data memory such that the data processing system records which system components are installed.

5. The method according to claim 4 wherein said airblock comprises three books, two of said books being passive airblock books and one of said books being said jumper book which includes said jumper.

6. The method according to claim 5 further comprising removing said passive airblock books and said jumper book is a set order by preventing the removal of said jumper book from said frame until after said passive airblock books are first removed.

7. A data processing system comprising:
   a frame having bays for holding system components including at least two nodes;
   at least two sets of critical functions, said sets of critical functions being supplied to ach node in said frame;
   a redundant power supply supplying power to one of said nodes in said frame and one set of said critical functions, said sets of critical functions being supplied to each node in said frame, said redundant power supply supplying power to one of said nodes in said frame and one set of said critical functions, said redundant power supply comprises three logic power supplies, each logic power supply slidably engageable in a node in said frame;
   a jumper book including a jumper slidably engageable in said frame in place of one of the nodes, said jumper which, when engaged in said frame, transfers power from said redundant power supply to the other of said critical functions; and
   a power connector in said frame engageable with a jumper connector in said jumper book when said jumper book is slidably engaged in said frame, said power connector being connected to at least one of said logic power supplies of said redundant power supply, said jumper being connected to said jumper connector and at least one of said critical functions such that standby power is transferred to the connected critical function when said jumper book is slidably engaged in said frame.

8. The data processing system according to claim 7 wherein each of said critical functions includes an oscillator and a system control processor for connection to at least one node installed in said frame.

9. The data processing system according to claim 7 wherein said jumper book is an airblock providing for the distribution of cooling air in said frame when said airblock is engaged in said frame.

10. The data processing system according to claim 9 further comprising a vital data memory for recording systems components such that the data processing system records which system components are installed.

11. The data processing system according to claim 10 wherein said airblock comprises three books, two of said books being passive airblock books and one of said books being said jumper book which includes said jumper.

12. The data processing system according to claim 11 wherein said passive airblock books and said jumper book include mechanical keys preventing the removal of said jumper book from said frame until after said passive airblock books are first removed.

13. A jumper book slidably engageable in a frame of a data processing system, said jumper book comprising:

a jumper connector for engaging with a power connector connected to one of at least three logic power supplies in a redundant power supply when said jumper book is slidably engaged in said frame;

a second connector for engaging with a critical function connector for providing standby power to one of at least two critical function sets in said data processing system when said jumper book is slidably engaged in said frame;

a jumper connected between said jumper connector and said second connector, said jumper connector including a pin connector for engagement with a pin arrangement, said pin arrangement having a spare pin connector which connects to standby power in said frame for powering said critical function; and said second connector including a pin connector for engagement with a second pin arrangement, said second pin arrangement having a power pin connector for powering said critical function.

14. The jumper book according to claim 13 wherein said jumper book is an airblock for assisting in the distribution of cooling air to said frame when said jumper book is slidably engaged in said frame.

15. The jumper book according to claim 13 further comprising a tab engagement surface engageable with a mechanical key on a passive book, said tab engagement surface for preventing the removal of said jumper book from said frame until after the removal of said passive book from said frame.

16. The jumper book according to claim 13 wherein said jumper is connected between said spare pin connector and said power pin connector.

* * * * *

UNITED STATES PATENT AND TRADEMARK OFFICE
CERTIFICATE OF CORRECTION

PATENT NO. : 7,643,307 B2 Page 1 of 1
APPLICATION NO. : 11/239602
DATED : January 5, 2010
INVENTOR(S) : Bosco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Sixteenth Day of November, 2010

David J. Kappos
*Director of the United States Patent and Trademark Office*